April 5, 1932.  W. E. RICHARD  1,852,757
HEADLIGHT
Original Filed March 7, 1928

Inventor:
William Edward Richard.
By Jones, Addington, Ames & Seibold
Attys.

Witness:
David S. Magnussen.

Patented Apr. 5, 1932

1,852,757

UNITED STATES PATENT OFFICE

WILLIAM EDWARD RICHARD, OF EVANSVILLE, INDIANA, ASSIGNOR TO SUNBEAM ELECTRIC MANUFACTURING COMPANY, OF EVANSVILLE, INDIANA, A CORPORATION OF INDIANA

HEADLIGHT

Original application filed March 7, 1928, Serial No. 259,736. Divided and this application filed November 8, 1929. Serial No. 405,582.

This invention relates to headlights of the type commonly used on locomotives and the like, and has particular relation to means for securing glass plates or lenses in position to constitute windows in the casings of such devices.

The present application is a division of my copending application, Serial No. 259,736, filed March 7, 1928.

The primary object of this invention is to provide means for securing glass plates or lenses in the walls or doors of headlights of the above-indicated character. The particular embodiment of the invention herein disclosed is a construction for holding one or more panes of glass in the side windows of headlights, which windows are customarily provided for displaying an identification number of the locomotive or other apparatus with which the light is associated. It is to be understood, however, that the invention is not limited to this particular application, as it may be readily adapted to any construction having similar requirements.

Figure 1:
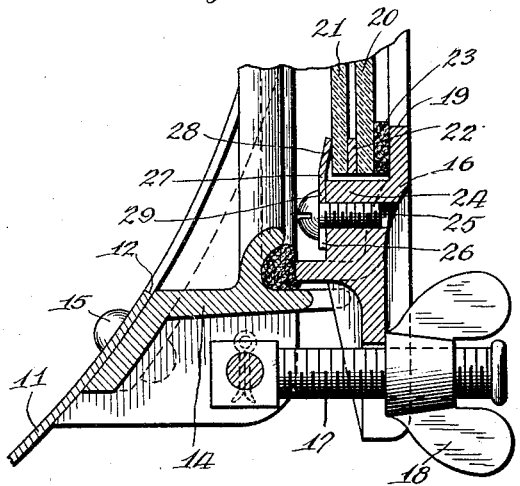
Figure 2:
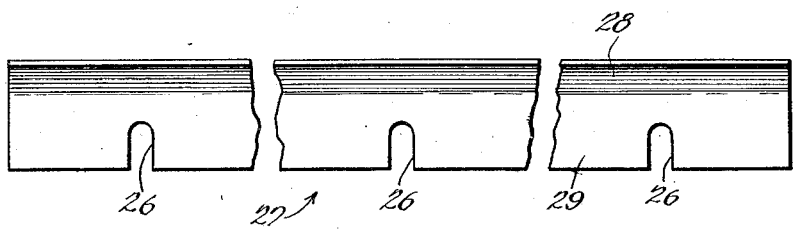

Further objects and advantages of the invention will appear from a consideration of the following detailed description in connection with the accompanying drawings, in which:

Figure 1 is a fragmentary sectional view of a portion of a headlight casing showing the invention embodied therein; and Fig. 2 is a detailed elevational view of a clamping member utilized in the construction shown in Fig. 1.

Referring to the drawings, a portion of a cylindrical headlight casing 11 is apertured at 12 and has a flame 14 attached to the outer surface thereof by rivets 15 or other suitable means. The opening in the frame 14 is of substantially the same dimensions as the aperture 12 in the wall of the headlight casing 11 so that a clear opening is provided from the interior of the casing through the door frame 14.

A door 16 is suitably mounted on the frame 14 as by hinges or other suitable means (not shown) and is adapted to be secured tightly closed by means of a bolt or stud 17 pivoted on the door frame 14, and a cooperating wing nut 18. The door 16 is apertured as indicated at 19 and this aperture is adapted to be closed by a transparent or translucent member forming a window in the side of the headlight casing. Since such windows are commonly utilized for displaying an identification number or the like, this transparent member is shown as comprising two panes of glass 20 and 21 which may be separated by a resilient gasket 22 or other suitable means. The outer glass 20 is commonly clear and the inner glass 21 is provided with a ground surface so that the identification number or the like may be imposed on the inner glass or on a separate member which may be inserted between the two glasses. These details are not important, however, in connection with the present invention and the two glasses 20 and 21 may be considered as a single member forming a window in the headlight casing.

A gasket 23 of rubber or other suitably resilient material is interposed between the marginal portions of the outside glass 20 and the portions of the door 16 which are overlapped by said glass immediately around the window opening 19 in said door. The door 16 is formed with an inwardly extending shoulder portion 24 forming a recess for the reception of the window glasses 20 and 21, and this shoulder portion is drilled and tapped at suitable intervals around the periphery thereof to receive screws 25. The shanks of these screws extend through slotted openings 26 in a clamping member 27, and the heads of these screws overlie the portions of said clamping members around the said openings 26. The form of such a clamping member 27 is shown in detail in the front elevational view of Fig. 2, from which it will be seen that the openings 26 for the reception of the screws 25 are disposed at relatively frequent intervals along one edge of such member. It will be understood that the window glasses 20 and 21 are of square or rectangular shape and that one of the clamping members 27 may be utilized at each of two opposite edges of the windows opening in the door 16, or at all of such edges if desired.

The clamping members 27 are of relatively thin, resilient metal and comprise marginal portions 28 bent to extend at an obtuse angle with respect to the body portions 29 of the members. When the clamping members are disposed in their proper positions in the assembled device, as shown in Fig. 1, the bent marginal portions 28 extend outwardly from the inner surface of the raised shoulder portion 24 against which the body portions 29 of such clamping members are secured by the screws 25. These bent marginal portions 28 of the clamping members 29 engage the inner surface of the inner window glass 21 along the corresponding edges thereof, and serve, by reason of the resiliency of the material of which said clamping members are made, to force the inner glass 21 firmly against the intermediate gasket 22 and the outer glass 20 against the outer gasket 23.

In removing and replacing the window glasses in the construction disclosed it is merely necessary to loosen the securing screws 25 sufficiently to permit the resilient clamping members 27 to be withdrawn, the slotted openings 26 in the body positions 29 of such clamping members then sliding freely past the shanks of the securing screws and out from under the heads of such screws. This operation can be accomplished in a very short time and does not require any appreciable mechanical skill on the part of the person performing such operation. When the window glasses are secured in position in the manner disclosed they are firmly held against rattling and displacement.

From the foregoing description it will be seen that the present invention provides a very simple and advantageous means for holding a window glass in place in a headlight or other construction having similar requirements.

While only one specific embodiment of the invention has been shown and described herein it will be readily understood that various changes and modifications may be made in the details of construction, and that the invention may be readily adapted for numerous applications other than the particular one disclosed, without departing from the spirit and scope of the invention, as set forth in the appended claims.

What is claimed as new and is desired to secure by Letters Patent, therefore, is:

1. Means for holding a glass pane in a window comprising a resilient metallic strip bent along its longitudinal axis and provided with a plurality of slots at right-angles to the longitudinal axis.

2. In a window frame, means for holding a glass pane in position comprising a resilient metallic strip bent along its longitudinal axis and having slots running at right-angles to its longest dimension, screws threaded into the window frame and cooperating with said slots to force the bent portion of said strip against the inner surface of the pane.

3. In a window frame or the like, means for holding a glass pane in position comprising a slotted resilient metallic strip bent longitudinally, a gasket positioned adjacent the interior side of the window frame and screws threaded into the frame and cooperating with said slotted strip to hold the same and press the bent portion thereof against the interior surface of the window pane whereby the latter is forced tightly against said gasket.

In witness whereof, I have hereunto subscribed my name.

WILLIAM EDWARD RICHARD.